United States Patent
Schuring Roelof

(10) Patent No.: US 11,156,203 B2
(45) Date of Patent: Oct. 26, 2021

(54) WIND TURBINE BLADE COMPRISING A BULKHEAD

(71) Applicant: LM WIND POWER US TECHNOLOGY APS, Kolding (DK)

(72) Inventor: Willem Schuring Roelof, Enschede (NL)

(73) Assignee: LM WIND POWER US TECHNOLOGY APS, Kolding (DK)

(*) Notice: Subject to any disclaimer, the term of this patent is extended or adjusted under 35 U.S.C. 154(b) by 0 days.

(21) Appl. No.: 16/345,945

(22) PCT Filed: Oct. 31, 2017

(86) PCT No.: PCT/EP2017/077849
§ 371 (c)(1),
(2) Date: Apr. 29, 2019

(87) PCT Pub. No.: WO2018/078177
PCT Pub. Date: May 3, 2018

(65) Prior Publication Data
US 2020/0056582 A1    Feb. 20, 2020

(30) Foreign Application Priority Data
Oct. 31, 2016  (EP) ..................................... 16196515

(51) Int. Cl.
*F03D 1/06* (2006.01)
*F03D 13/00* (2016.01)

(52) U.S. Cl.
CPC ........... *F03D 1/0675* (2013.01); *F03D 13/00* (2016.05)

(58) Field of Classification Search
CPC ............................... F03D 1/0675; F03D 13/00
(Continued)

(56) References Cited

U.S. PATENT DOCUMENTS

| 4,739,954 A * | 4/1988 | Hamilton | B64C 3/26 244/123.1 |
| 7,740,453 B2 * | 6/2010 | Zirin | F03D 13/40 416/226 |

(Continued)

FOREIGN PATENT DOCUMENTS

| DE | 102011083152 A1 | 3/2013 |
| WO | 2009085041 A1 | 7/2009 |
| WO | 2012119934 A1 | 9/2012 |

OTHER PUBLICATIONS

Bridgewood, 2014, Vacuum-Formed Wind Turbine Parts, https://www.bridgewooduk.com/blog/production/vacuum-formed-wind-turbine-parts (Year: 2014).*

(Continued)

*Primary Examiner* — Michael L Sehn
(74) *Attorney, Agent, or Firm* — Nath, Goldberg & Meyer; Jerald L. Meyer; Tanya E. Harkins

(57) ABSTRACT

This invention relates to a method of manufacturing a bulkhead unit, a method of installing a bulkhead unit, a bulkhead, a bulkhead unit and a wind turbine blade. The bulkhead is manufactured by vacuum forming or rotational moulding and has a set of predetermined openings formed during manufacturing. Various additional elements are pre-mounted or pre-integrated into the bulkhead before installation of the bulkhead unit. This pre-assembled unit can then be positioned inside the blade root section and connected to the blade section.

10 Claims, 4 Drawing Sheets

(58) Field of Classification Search
USPC .......................................................... 416/248
See application file for complete search history.

(56) References Cited

U.S. PATENT DOCUMENTS

| | | | | |
|---|---|---|---|---|
| 8,475,133 B2* | 7/2013 | Baker | ................... | F03D 1/0675 |
| | | | | 416/226 |
| 8,510,947 B2* | 8/2013 | Kirkpatrick | ........... | F03D 1/0675 |
| | | | | 29/889.71 |
| 9,133,818 B2* | 9/2015 | Hayden | ................. | F03D 1/0675 |
| 2012/0013038 A1* | 1/2012 | Stege | .................... | B29C 33/302 |
| | | | | 264/219 |
| 2013/0164144 A1* | 6/2013 | Bendel | .................. | F03D 1/0675 |
| | | | | 416/230 |
| 2014/0234116 A1* | 8/2014 | Cussac | .................. | F03D 1/0675 |
| | | | | 416/226 |

OTHER PUBLICATIONS

Lenz, 2013, Bulkhead for a Wind Turbine Blade, WO 2013/041190 A1—English Translation (Year: 2013).*

* cited by examiner

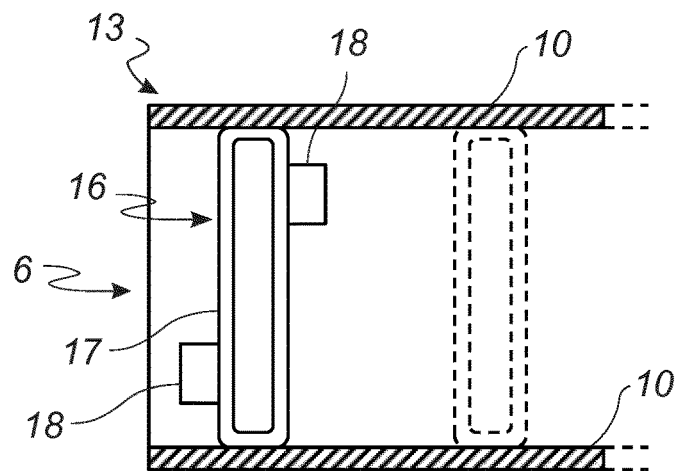
Fig. 3a
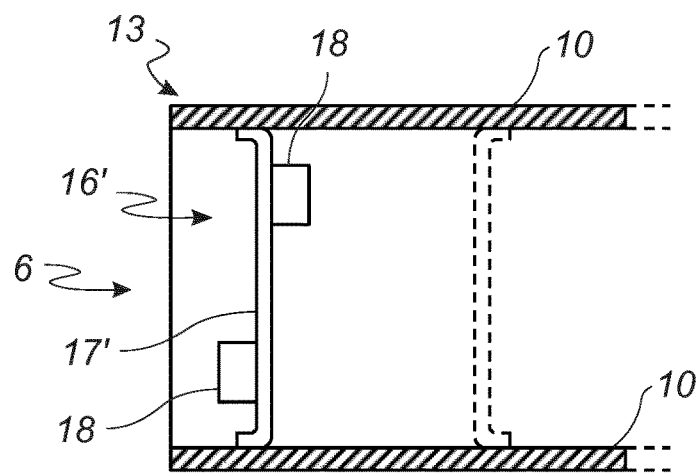
Fig. 3b
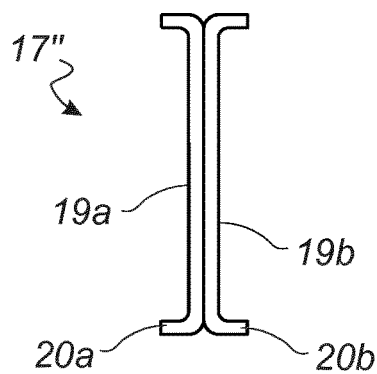 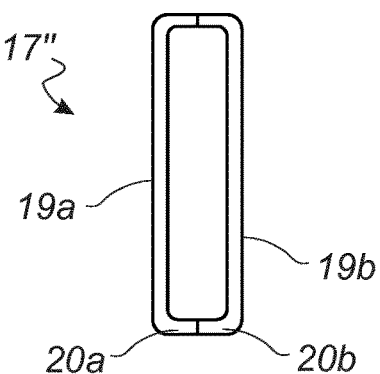
Fig. 4a     Fig. 4b

WIND TURBINE BLADE COMPRISING A BULKHEAD

This is a National Phase Application filed under 35 U.S.C. 371 as a national stage of PCT/EP2017/077849, filed Oct. 31, 2017, an application claiming the benefit of European Application No. 16196515.7, filed Oct. 31, 2016, the content of each of which is hereby incorporated by reference in its entirety.

TECHNICAL FIELD

The present invention relates to a method of manufacturing a bulkhead unit for a wind turbine blade, comprising the step of providing a bulkhead having at least a first side, a second side, and an outer circumference, the first and second sides face in opposite axial directions and the outer circumference is arranged in a radial plane, wherein the outer dimensions of the bulkhead substantially corresponds to the inner dimensions of a blade root section of a wind turbine blade.

The present invention further relates to a method of installing a bulkhead unit in a wind turbine blade of a wind turbine, the wind turbine blade extends in a longitudinal direction from a blade root to a tip end and in a chordwise direction from a leading edge to a trailing edge, wherein the wind turbine blade comprises a blade shell defining a pressure side and a suction side, the wind turbine blade further comprises a blade root section comprising the blade root.

The present invention also relates to a bulkhead, a bulkhead unit and a wind turbine blade.

BACKGROUND

It is known to place bulkheads in the blade root section of a wind turbine blade of a modern wind turbine, typically within a relative length of up to 0.2 from the blade root in the longitudinal direction. The wind turbine blade has a total relative length of 1 measured between the blade root and the tip end. The bulkhead is used to close off the interior of the wind turbine blade so that debris, e.g. blocks of excess glue, and fluid, e.g. water or oil, are prevented from entering the hub during rotation. The bulkhead also prevents loose items from the hub or other wind turbine blades from entering the wind turbine blade. The bulkhead may also provide a working platform for the workers during maintenance or repair tasks inside the wind turbine blade or hub.

A known problem in the blade root section is ovalisation due to the aerodynamic forces acting on the wind turbine blade during operation. The ovalisation of the blade root in-creases the risk of failures in the bolt connections between the blade root and the hub or pitch bearing unit. This problem can be solved by adding extra layers of core material to the sandwich laminate in that blade section; however, this adds to the total weight and costs of the wind turbine blade.

This ovalling movement also increases the stresses in the glue line along the circumference of the bulkhead, which may result in cracks or faults in the glue line so that the bulkhead becomes loose. Secondly, it is difficult to achieve a perfect cylindrical inner surface of the blade root section during manufacturing and thus gaps or voids may occur along the circumference of the bulkhead. A filler material or a sealing material can be used to fill up these gaps or voids in order to seal off the interior of the wind turbine blade.

Another solution is to arrange a continuous flexible attachment part or multiple attachment parts along to the circumference of the bulkhead as disclosed in WO 2012/119934 A1. The bulkhead has a sandwich structure comprising a central core element and a fibre reinforced layer located on both sides of the core element. Each attachment part comprises an elastomeric material capable of deforming according to the contour of the inner surface of the blade root section to seal off the interior space. After the bulkhead is positioned in the installation position, the attached part or parts is/are mounted or glued to the blade root section. This solution adds extra steps to the manufacturing and installation process of the bulkhead.

Yet another solution is to arrange an adjustable mounting collar along to the circumference of the bulkhead as disclosed in WO 2015/121408 A1. The bulkhead is made of a transparent fabric material. The mounting collar comprises a resilient material extending along the majority of the circumference wherein an adjustable spring element is attached to the ends of this mounting collar. The spring element is compressed to allow an easy positioning of the bulkhead. Once placed in the installation position, the spring element is released to bring the mounting collar into contact with the blade root section. Multiple bracket elements integrated into the blade section are used to secure the bulkhead in its position. This solution adds extra steps to installation process and increases the installation time.

WO 2009/085041 A1 discloses a flexible flange allowing relative movement between the root end section and the disc shaped bulkhead during ovalization. The flexible flange is attached to a side surface of the bulkhead and further to an inner surface of the root end section. This application is silent about how the bulkhead is made.

WO 2013/041190 A1 discloses an substantially U-shaped bulkhead having a peripheral cylindrical portion which is attached to the root end section and transforms into a smaller intermediate cylindrical portion. The intermediate cylindrical portion further transforms into a central disc shaped portion. The bulkhead has a laminate structure made of a number of fibre layers infused with resin. The central portion is sandwiched between an anti-slip coating facing the rotor hub and impact protective mats or plates facing the blade tip.

Therefore, a need exists for an improved bulkhead unit which allows for a strong connection and a cheap production.

OBJECT OF THE INVENTION

An object of the invention is to provide a wind turbine blade and a bulkhead unit that solves the abovementioned problems.

Another object of the invention is to provide a wind turbine blade that allows for a quick and easy installation of a bulkhead, particularly a pre-assembled bulkhead unit.

Yet another object of the invention is to provide a method that allows for a cheap manufacturing of a bulkhead, particularly a pre-assembled bulkhead unit.

Another further object of the invention is to provide a method that allows a quick and simple installation of a bulkhead, particularly a pre-assembled bulkhead unit.

DETAILED DESCRIPTION OF THE INVENTION

An object of the invention is achieved by a method of manufacturing a bulkhead unit for a wind turbine blade, the wind turbine blade extends in a longitudinal direction from a blade root to a tip end and in a chordwise direction from a leading edge to a trailing edge, wherein the method comprises the step of:

> manufacturing a bulkhead, wherein the bulkhead, when installed, extends in a radial direction and has at least a first side, a second side, and an outer circumference, the first and second sides face in opposite longitudinal/axial directions and the outer circumference is arranged in a chordwise/radial plane, wherein the outer dimensions of the bulkhead substantially corresponds to the inner dimensions of a blade root section of a wind turbine blade, characterised in that the bulkhead comprises at least one bulkhead part, wherein said at least one bulkhead part is manufactured by rotational moulding or vacuum forming.

This enables the bulkhead unit to be manufactured and assembled separately from the wind turbine blade. This further allows for a cheap manufacturing process of the bulkhead unit which further can be automated and thus further save manufacturing costs and time. The bulkhead unit can thus be manufactured and assembled at a separate site, e.g. a separate factory or division, and then packed and transported to the site of the wind turbine blade for subsequent installation.

Conventional bulkheads are typically manufactured using a mould and a lay-up process in order to produce a sandwich structure with a central core material sandwiched between layers of a fibre reinforced material. After manufacturing, a time consuming cutting process is used to provide various openings of different sizes for subsequent mounting of hatches, ventilation tubes, electrical cables, lightning down conductors and other elements. This adds to the total manufacturing costs and cycle time and increases the amount of waste material.

The use of rotational moulding or vacuum forming allows for a cheap and simple manufacturing process with a minimum of waste material compared to other known manufacturing techniques. Openings of different sizes and shapes can thus be incorporated in the design of the mould used to form the bulkhead. The bulkhead can thus be manufactured with a predetermined set of access openings and/or other openings prepared for installation of one or more desired elements as mentioned later. Additional openings can fast and easily be formed in the bulkhead, e.g. via stamping, if needed. This reduces total cycle time after completion of the moulding process. This also saves material as all or the majority of the openings can be formed during manufacturing.

The use of rotational moulding or vacuum forming further enables one or more areas of the bulkhead to be prepared for the mounting or installation of a particular element. For example, these prepared areas may comprise one or more recesses configured for receiving and holding a particular element, wherein the shape and size of said recesses substantially match the shape and size of that element. For example, these prepared areas may comprise one or more reference markings or mounting points for mounting that element. This allows the elements to be mounted or installed in well-defined areas on each bulkhead. This provides a standardised way of mounting or installing the desired elements for a particular wind turbine blade which can further reduce the total cycle time.

According to one embodiment, the bulkhead comprises a first bulkhead part and at least a second bulkhead part, the method further comprises the steps of:

> aligning the at least second bulkhead part relative to the first bulkhead part in the longitudinal or radial direction,
>
> bringing the first bulkhead part and the at least second bulkhead part into contact with each other to form the bulkhead.

The bulkhead may be manufactured as a single disc or plate-shaped element with two opposite sides facing in different axial directions and an outer circumference facing in the radial direction. When installed, the radial direction is equal to the chordwise direction and the axial direction is equal to the longitudinal direction. One or both sides may also act as a working platform for workers located in the wind turbine blade or the hub during repairs or maintenance. The bulkhead may have a predetermined total thickness measured in the axial direction between the two sides and a predetermined wall thickness. The total thickness may be, but not limited to, up to 15 centimetres. The wall thickness may be, but not limited to, up to 5 centimetres. This provides a relative stable working platform.

The outer dimensions, e.g. outer diameter, of the bulkhead may substantially correspond to the inner dimensions, e.g. inner diameter, of the blade shell in the blade root section. This allows the bulkhead to substantially be brought into contact with the inner surface of the blade shell.

Alternatively, the outer dimensions of the bulkhead may be smaller than the inner dimensions so that a gap is formed between the bulkhead and the blade shell. One or more adjustable and/or deformable elements, e.g. a collar, may be arranged at the circumference of the bulkhead to fill out this gap. Alternatively, a filler material may be used to fill out this gap.

The bulkhead may also be manufactured as two or more bulkhead parts which together define the disc or plate-shaped element. The individual bulkhead parts may be jointed together by a suitable adhesive or a suitable mechanical coupling, e.g. tongue and grooves or bolts and nuts. This allows for easier handling of the bulkhead during transport and installation.

According to one embodiment, the first bulkhead part is arranged relative to the at least second bulkhead part so that one side of each of said first and second bulkhead parts are contacting each other, or so that an installation flange of each of the first and second bulkhead parts are contacting each other.

The abovementioned bulkhead, or bulkhead parts, may comprise one or more installation flanges projecting outwards from the first and/or second sides in the axial direction. This or these installation flanges may be arranged at the outer circumference of the bulkhead and used to mount or adhere the bulkhead to the blade shell of the wind turbine blade. The installation flange(s) may be located on one or both sides of the bulkhead. This allows for a relative large contact surface with the blade section and thus a stronger connection to the blade shell.

The bulkhead parts may further comprises one or more installation flanges used to joint two adjacent bulkhead parts together. Each bulkhead part may comprise one or more installation flanges configured to be jointed to one or more matching installation flanges of another bulkhead part. The individual bulkhead parts may then be jointed, e.g. mounted or adhered, together to form the bulkhead.

During manufacturing, the bulkhead parts may be produced as a single piece which is then cut into the desired shapes. The bulkhead parts may also be produces as individual pieces. These pieces may finally be worked using any known process into the final shape and dimensions.

The individual bulkhead parts may be aligned and jointed together in the axial and/or radial direction dependent on the particular configuration of the wind turbine blade. For example, the bulkhead parts may be aligned in the axial direction so that opposite facing sides or installation flanges of the respective bulkhead parts are brought into contact with each other. For example, the bulkhead parts may be aligned in the radial direction so that opposite facing contact surfaces or installation flanges of the respective bulkhead parts are brought into contact with each other. Alternatively, the bulkhead parts may be aligned in a combined axial and radial direction. This enables the bulkhead parts to be jointed together before positioning the bulkhead unit inside the wind turbine blade or during the installation of the bulkhead unit.

According to one embodiment, the method further comprises the step of mounting or installing at least one other element on the bulkhead prior to installation of the bulkhead unit, wherein said at least one other element is arranged on at least one of said first and second sides.

The bulkhead can suitably, after manufacturing, advantageously be fitted with hatches, ventilation tubes, lightning down conductors, sensors, reference markings, de-icing elements, air guiding elements or other suitable elements. These elements may be pre-installed or pre-mounted on the bulkhead using the set of predetermined openings formed in the bulkhead. The bulkhead may suitably be configured to provide support for these elements so that the structural loads and/or cyclic load, e.g. vibrations, of these elements are transferred to the bulkhead and further to the blade section.

This allows the bulkhead and these elements to form a pre-assembled unit, i.e. bulkhead unit, which can be assembled separate from the wind turbine blade without potentially damaging the blade shell. This also allows for a faster and safer installation and mounting process since it can be performed outside the wind turbine blade. This bulkhead unit can then be packed and transported to the wind turbine blade for subsequent installation.

In conventional wind turbine blades, the bulkhead is initially positioned and connected to the blade shell before the remaining other elements are installed on the bulkhead. This restricts the movability of the workers during the installation and thus adds to the total cycle time as the workers also have to cut out any required openings. It also increases the risk of accidental damages to the blade shell during this installation process.

Another object of the invention is achieved by a method of installing a bulkhead in a wind turbine blade of a wind turbine, the wind turbine blade extends in a longitudinal direction from a blade root to a tip end and in a chordwise direction from a leading edge to a trailing edge, wherein the wind turbine blade comprises a blade shell defining a pressure side and a suction side, the wind turbine blade further comprises a blade root section comprising the blade root, characterised in that the method comprises the steps of:
  providing at least one bulkhead unit as defined above, wherein the at least one bulkhead unit is pre-assembled prior to installation,
  positioning said at least one bulkhead unit in the blade root section at a predetermined distance from the blade root,
  installing the at least one bulkhead unit inside the wind turbine blade so that said at least one bulkhead unit substantially seals off the blade root.

The abovementioned bulkhead unit can be manufactured and assembled separate from the wind turbine blade as described above. The bulkhead unit may then be packed and transported to the desired installation site. This allows for a cheap manufacturing process which reduces the total cycle time after the bulkhead has been moulded/formed, thereby reducing the total manufacturing costs and time.

The bulkhead unit may then be unpacked and lifted into alignment with the blade root of the wind turbine blade using suitable lifting means, e.g. a crane unit. The bulkhead unit may then be moved, e.g. in the longitudinal direction, into its installation position inside the blade root section. The bulkhead unit may be positioned at a distance of up to 75 centimetres measured from the blade root. Alternatively, the bulkhead unit may be aligned with the blade root. Once positioned in the desired position, the bulkhead may be adhered to the blade shell using a suitable adhesive, e.g. a two-component epoxy, or via suitable brackets integrated or attached to the blade shell. Other attachment techniques may be used. This allows the bulkhead unit to seal off the blade root and to prevent debris or other items from entering or exiting the interior of the wind turbine blade.

According to one embodiment, the method further comprises the step of milling an inner surface of the blade root section prior to positioning the at least one bulkhead unit in the blade root section.

The inner surface of the blade root section may be milled using a milling tool in order to compensate for any variations or tolerances in the dimensions of the inner surface. The milling tool may be manually or automatically controlled via a control unit. The milling tool may be used to mill the surface area between the blade root and the desired location of the bulkhead unit, or only the surface area at the desired location. This enables the blade shell to have a more or less perfect cylindrical shape which allows for a tight fit around the circumference of the bulkhead. No filler material or no adhesive is needed to seal off the blade root.

One or more extra layers may be added to the laminate at the blade root section in order to maintain the balancing of the bushings provided in the laminate. These extra layers may be added towards the inner surface and, optionally, also towards the outer surface of the laminate. The outer surface may then be grinded or otherwise worked into the desired shape. The inner surface may at the same time be milled or otherwise worked into the desired shape and dimensions. This allows the blade root section to maintain the structural integrity without increasing the risk of a failure at the bushings.

According to one embodiment, the method further comprises the step of mounting or integrating at least one adjustable element and/or at least one deformable element at the circumference of the at least one bulkhead unit prior to positioning the at least one bulkhead unit in the blade root section.

The bulkhead may have outer dimensions that are smaller than the inner dimensions of the blade shell so that a gap is between the bulkhead and the blade shell. A deformable element, e.g. a flexible lip, tube or ring, may be mounted or integrated into the bulkhead at the circumference. The bulkhead and the deformable element may together have outer dimensions that are larger than the inner dimensions of the blade shell. The deformable element may be partly or fully made of an elastomeric material, e.g. rubber or another polymer material. The deformable element may also have deformable structure capable of deforming according to the contours of the inner surface of the blade shell. This allows the deformable element to fill up the gap and thus seal off the blade root.

An adjustable element, e.g. an adjustable collar, may also be mounted or integrated into the bulkhead at the circumference. The adjustable element may be configured to increase or decrease its outer dimensions, e.g. the outer diameter, via an adjustment mechanism. The adjustment mechanism may be a spring element, e.g. a compression spring, or another suitable adjustment mechanism. The outer dimensions of the bulkhead and the adjustable element may thus be decreased during positioning and then increased again during installation to fill up the gap.

The deformable element and/or adjustable element may be constructed to provide sufficient structural strength to carry the bulkhead, incl. the elements mounted or installed thereon, during operation. The deformable element and/or adjustable element may further have sufficient flexibility to deform according to the ovalisation of the blade root section, thereby preventing the bulkhead from being torn loose from the blade shell.

Yet another object of the invention is achieved by a bulkhead for a wind turbine blade, having a first side, an opposite second side and an outer circumference, wherein the outer dimensions of the bulkhead substantially corresponds to the inner dimensions of a blade root section of a wind turbine blade, characterised in that said bulkhead comprises at least one bulkhead part, wherein said at least one bulkhead part is manufactured by rotational moulding or vacuum forming.

The bulkhead of the present invention is manufactured using rotational moulding or vacuum forming. The bulkhead may be made from a thermoplastic material, e.g. a polyurethane material, a polyethylene material or another suitable material. The material is preferably selected to have high bonding capability with the material or laminate of the blade shell. This provides a lightweight and hollow structure which is easy to handle during positioning and installation. No core material is needed.

The structure of the bulkhead, e.g. with predetermined openings, is selected to provide sufficient structural strength so that it can also function as a platform for the workers moving around in the wind turbine blade or in the hub. The bulkhead is further configured to transfer the static and optionally dynamic loads derived from the elements integrated or mounted on the bulkhead to the blade shell of the wind turbine blade.

Additionally, an object of the invention is achieved by a bulkhead unit for a wind turbine blade, the bulkhead unit is configured to be installed in a blade root section of a wind turbine, characterised in that the bulkhead unit is a pre-assembled unit comprising:

a bulkhead as defined above, and
at least one other element mounted on or integrated into said bulkhead, wherein said at least one other element is arranged on at least one of said first and second sides.

The bulkhead of the present invention is fitted with one or more desired elements as described above so that the bulkhead and these mounted or integrated elements define a pre-assembled unit. The mounting or integration process is not restricted by the confined space inside the blade root section of the wind turbine blade, and thus the total cycle time can be reduced. Any waste or excess material from this mounting or integration process does not have to be removed from the wind turbine blade afterwards. The bulkhead unit, i.e. the pre-assembled unit, can thus be packed and transported to the location of the wind turbine blade for subsequent installation. In conventional bulkhead units, these elements are not mounted or integrated until after the bulkhead has been installed in the wind turbine blade which adds to the total cycle time. Secondly, a relative time-consuming process is needed to cut out the required openings before the respective element can be installed or mounted.

Also, an object of the invention is achieved by a wind turbine blade for a wind turbine, the wind turbine blade extends in a longitudinal/axial direction from a blade root to a tip end and in a chordwise direction from a leading edge to a trailing edge, wherein the wind turbine blade comprises a blade shell defining a pressure side and a suction side, the wind turbine blade further comprises a blade root section comprising the blade root in which at least one bulkhead unit is arranged, characterised in that said at least one bulkhead unit is a pre-assembled unit as defined above or comprises a bulkhead as defined above.

The bulkhead unit described above can thus be lifted or hoisted into alignment with the blade root section and thus moved into the desired position relative to the blade root using lifting or hoisting means, e.g. a crane unit or a winch system. The bulkhead unit, e.g. the bulkhead, may then be connected to the blade shell via a mechanical connection or coupling. No adhesive is needed.

Brackets integrated in the inner surface of the blade shell at the blade root section may be used to connect the bulkhead unit to the blade shell. Alternatively, the brackets may be mounted to the inner surface using fasteners, e.g. coach screws or bolts. The bracket may further be connected to the bulkhead unit using other fasteners, e.g. coach screws or bolts. The bracket may be omitted and the bulkhead unit may be directly connected to the blade shell via the fasteners. This allows the bulkhead unit to be secured to the blade shell.

The bulkhead unit may also be directly connected to a stiffening element, e.g. a root flange, arranged between the blade root and the pitch bearing unit or the mounting interface of the hub. This stiffening element may be configured to add stiffness to the blade root end. One or more intermediate connecting elements, e.g. another bracket or spacer, may optionally be arranged between the bulkhead unit and the stiffening element. Alternatively, the intermediate connecting elements may form part of the stiffening element. This allows the bulkhead unit to be secured to the blade shell.

Said fasteners may extend through the stiffening element, the bulkhead unit and optionally the intermediate connecting element. This allows the tension force of the fasteners to be adjusted, if needed.

DESCRIPTION OF DRAWINGS

The invention is explained in detail below with reference to embodiments shown in the drawings, in which FIGS. 3a-b show a cross section of the blade root section and two alternative first embodiments of the bulkhead unit, FIGS. 4a-b show a second embodiment of the bulkhead and two exemplary arrangements of the bulkhead parts.

LIST OF REFERENCES

Figure 1:
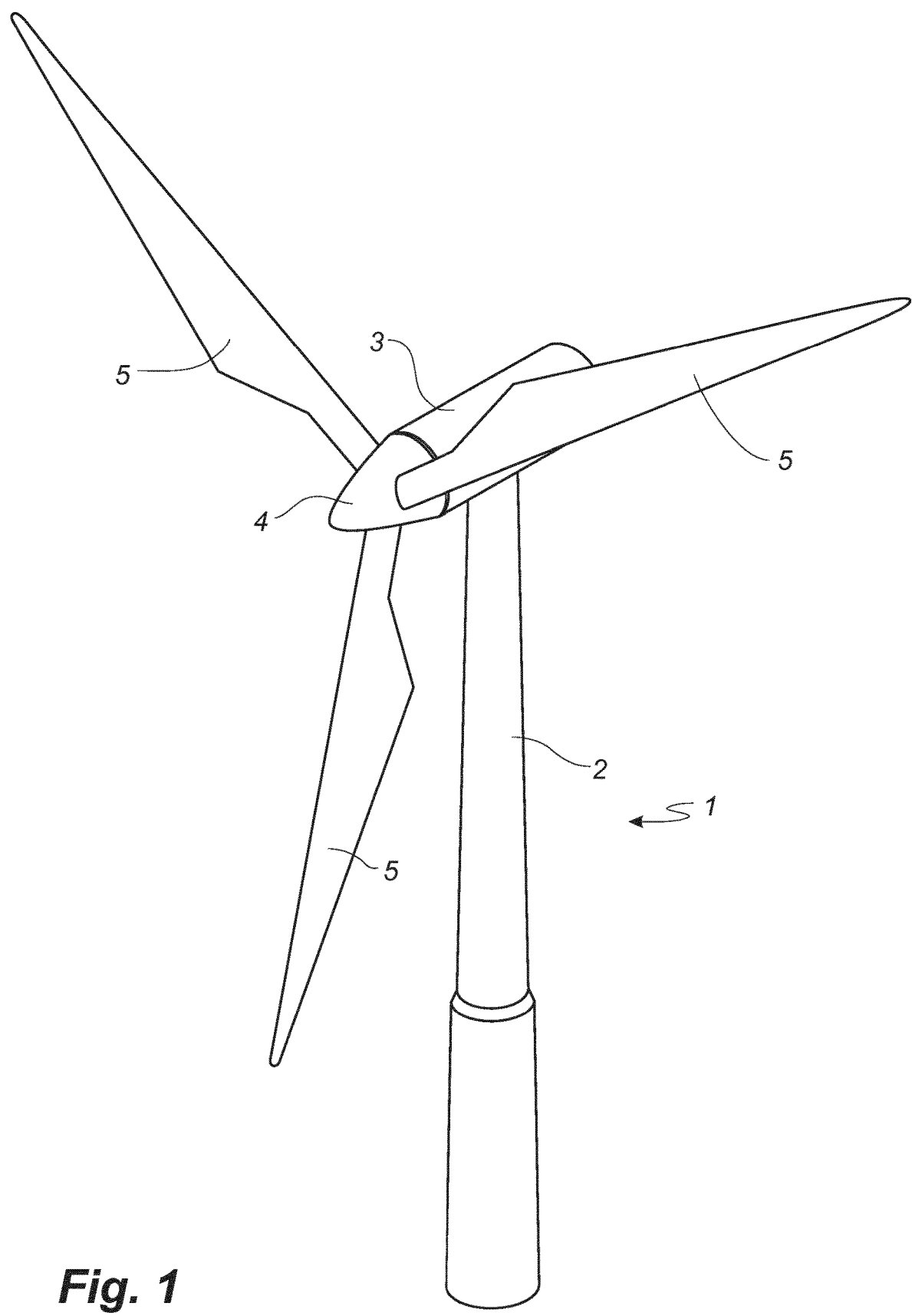
FIG. 1 shows a wind turbine.

1. Wind turbine
2. Wind turbine tower
3. Nacelle

4. Hub
5. Wind turbine blades
6. Blade root
7. Tip end
8. Leading edge
9. Trailing edge
10. Blade shell
11. Pressure side
12. Suction side
13. Blade root section
14. Aerodynamic blade section
15. Transition section
16, 16'. Bulkhead unit, first bulkhead unit
17, 17', 17", 17'''. Bulkhead
18. Other elements
19a, 19b. Bulkhead parts
20a, 20b. Installation flanges
21a, 21b, 21c. Bulkhead parts
22. Openings for hatches
23. Openings for lightning down conductors and data cables
24. Openings for ventilation tubes and air guidance systems
25. Adjustable element
26. Deformable element The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2 via a yaw bearing unit. The rotor comprises a hub 4 and a number of wind turbine blades 5, here three wind turbine blades are shown. The hub 4 is connected to a drive train located in the nacelle 3 via a rotation shaft.

The hub 4 comprises a mounting interface for each wind turbine blade 5. A pitch bearing unit is optionally connected to this mounting interface and further to the wind turbine blade 5.

Figure 2:
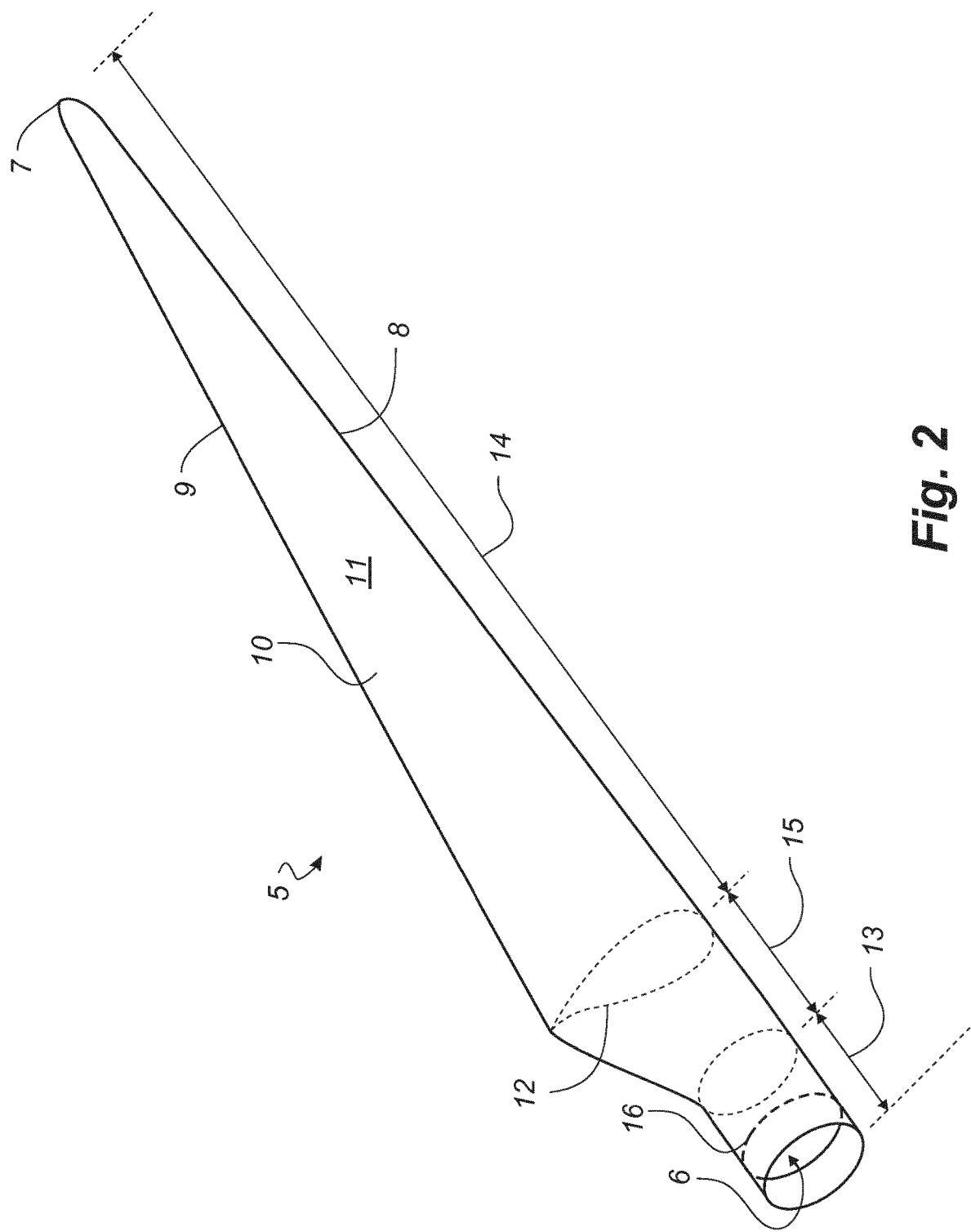
FIG. 2 shows a schematic view of a wind turbine blade according to embodiments of the invention.

FIG. 2 shows a schematic view of the wind turbine blade 5 which extends in a longitudinal direction from a blade root 6 to a tip end 7. The wind turbine blade 5 further extends in a chordwise direction from a leading edge 8 to a trailing edge 9. The wind turbine blade 5 comprises a blade shell 10 defining a pressure side 11 and a suction side 12. The blade shell 10 further defines a blade root section 13, an aerodynamic blade section 14, and a transition section 15 between the blade root section 13 and the aerodynamic blade section 14.

The blade root section 13 has a substantially circular or elliptical cross-section (indicated by dotted lines). The blade root section 13 together with the load carrying structure, e.g. the spar cap and shear webs or box, are configured to add structural strength to the wind turbine blade 5 and transfer the dynamic loads to the hub 4. The load carrying structure extends between the pressure side 11 and the suction side 12 and in the longitudinal direction.

The blade aerodynamic blade section 14 has an aerodynamically shaped cross-section (indicated by dotted lines) designed to generate lift. The cross-sectional profile of the blade shell 10 gradually transforms from the circular or elliptical profile into the aerodynamic profile in the transition section 15.

The wind turbine blade 5 further comprises a bulkhead unit 16 located in the blade root section 13.

FIGS. 3a-b show a cross section of the blade root section 13 along the longitudinal direction, wherein a first bulkhead unit 16, 16' is arranged at a predetermined distance from the blade root 6. At least a second optional bulkhead unit (indicated by dashed lines) can be arranged at a predetermined distance from the first bulkhead unit 16, 16' as shown in FIGS. 3a-b.

A first embodiment of the bulkhead unit 16 is further shown in FIG. 3a, wherein the bulkhead unit 16 comprises a bulkhead 17 and a number of other elements 18 mounted or integrated on the bulkhead 17. The other elements 18 can be lightning down conductors, ventilation tubes, de-icing elements, sensors, air guidance elements or other relevant elements. The bulkhead 17 acts as a support for these elements 18 during operation.

The bulkhead unit 16 is positioned at a predetermined distance, e.g. between 50 centimetres and 75 centimetres, from the blade root 6. The bulkhead unit 16 is configured to substantially seal off the blade root 6 so that loose debris is prevented from entering the wind turbine blade 5 or the hub 4. The bulkhead unit 16 also functions as a work platform during maintenance or repair tasks in the hub 4 or the wind turbine blade 5.

The bulkhead 17 is here manufactured as a single plate shaped element using rotational moulding. The bulkhead 17 comprises a first side facing the blade root, a second side facing the tip end 7 and a circumference facing an inner surface of the blade shell 10. The respective elements 18 can be mounted or integrated onto one or both sides of the bulkhead 17 as shown in FIG. 3a.

Another first alternative embodiment of the bulkhead unit 16' is further shown in FIG. 3b, wherein the bulkhead 17' is here manufactured as a single plate shaped element using vacuum forming.

The bulkhead 17' comprises a number of installation flanges (similar to those shown in FIGS. 4a-b) projecting outwards the first side towards to the blade root 6. The orientation of the bulkhead unit 16' may also be inverted so that the installation flanges projects towards the blade tip 7, as indicated in FIG. 3b. The installation flange is used to connect the bulkhead 17' to the blade shell 10. Similar to the embodiment of FIG. 3a, the respective elements 18 can be mounted or integrated onto one or both sides of the bulkhead 17' as shown in FIG. 3b.

FIGS. 4a-b show a second embodiment of the bulkhead 17" comprising a number of bulkhead parts 19a, 19b aligned in the axial direction. Here only two bulkhead parts are shown. FIG. 4a shows a first exemplary arrangement where the bulkhead parts 19a, 19b are arranged back-to-back and thus form a generally I-shaped structure.

The bulkhead part 19a, 19b comprises an installation flange 20a, 20b projecting outwards from the first and second sides of the bulkhead 17". Here the individual installation flanges 20a, 20b are facing away from each other. The installation flanges 20a, 20b are used to connect the bulkhead unit 17" to the blade shell 10.

FIG. 4b shows a second exemplary arrangement of the bulkhead 17" where the bulk-head parts 19a, 19b are arranged front-to-front and thus form a generally O-shaped structure. Here the individual installation flanges 20a, 20b are facing towards each other and thus projects in an opposite direction of the first and second sides of the bulk-head 17".

The installation flanges shown in FIG. 3b and FIGS. 4a-b are here for illustrative purposes shown as a continuous flange extending along the entire circumference. However, the installation flange of FIG. 3b can have a different shape and/or size than the installation flange of FIGS. 4a-b.

Figure 5:
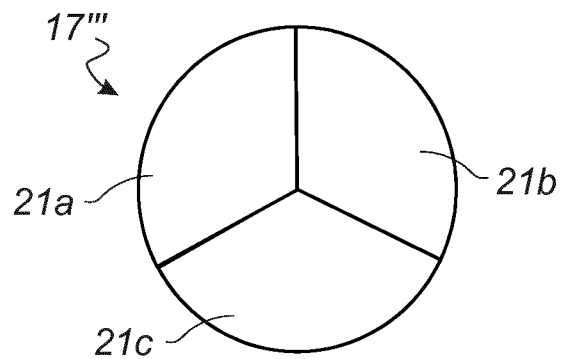
FIG. 5 shows a third embodiment of the bulkhead and an alternative arrangement of the bulkhead parts.

FIG. 5 shows a third embodiment of the bulkhead 17''' comprising a number of bulk-head parts 21a, 21b, 21c aligned in the radial direction. Here only three bulkhead parts are shown. Each bulkhead part 21a, 21b, 21c is connected an adjacent bulkhead part 21a, 21b, 21c via matching installation flanges configured to be jointed together.

The respective elements 18 can be mounted or integrated onto at least one of the bulkhead parts 19a, 19b, 21a, 21b, 21c shown in FIG. 4a-b and FIG. 5.

Figure 6:
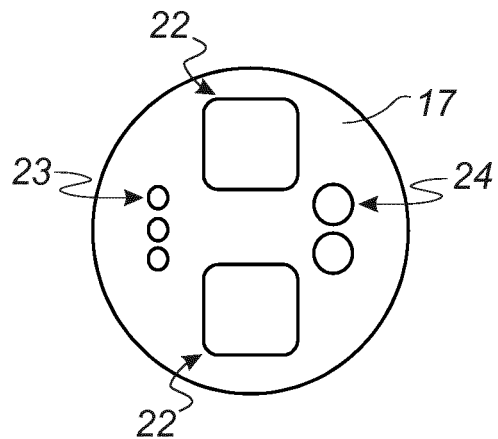
FIG. 6 shows the bulkhead with pre-determined openings for mounting or installation of other elements.

FIG. 6 shows the bulkhead 17 with a number of predetermined openings for subsequent mounting or installation of the elements 18 after manufacturing. The openings are formed via a suitable mould with a predetermined pattern defining the shape and sizes of each opening.

The bulkhead 17 comprises a first set of openings 22 configured for mounting a hatch (not shown) which provides access to the interior of the wind turbine blade 5. The bulk-head 17 further comprises a second set of openings 23 configured for mounting of lightning down conductors, data cables and other relevant electrical connections. The bulkhead 17 further comprises a third set of openings 24 configured for mounting ventilation tubes, air guidance systems and other relevant heating or cooling systems.

The bulkhead unit 16 can then positioned inside the blade shell 10 and connected to the blade shell 10. After that the respective elements 18 can be connected or coupled to matching elements located in the wind turbine blade 5 or the hub 4.

Figure 7:
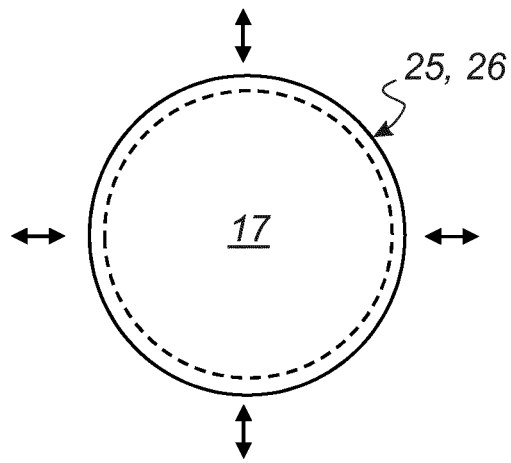
FIG. 7 shows a fourth embodiment of the bulkhead with an adjustable or deformable element.

FIG. 7 shows a fourth embodiment of the bulkhead 17 with an adjustable element 25 or a deformable element 26. The adjustable element 25 is configured to change the outer dimensions of the bulkheadunit 16, e.g. the bulkhead 17, as indicated by the arrows. This allows for an easy positioning of the bulkhead unit 16 and enables the bulkhead unit 16 to seal off the blade root 6.

The deformable element 26 is configured to deform to the contours of the inner surface of the blade shell 10 and thus seal off the blade root 6.

The invention claimed is:

1. A method of manufacturing a bulkhead unit (16) for a wind turbine blade (5), the wind turbine blade (5) extends in a longitudinal direction from a blade root (6) to a tip end (7) and in a chordwise direction from a leading edge (8) to a trailing edge (9), wherein the method comprises the steps of:
manufacturing a bulkhead (17), wherein the bulkhead (17), when installed, extends in a radial direction and has at least a first side, a second side, and an outer circumference, the first and second sides face in opposite longitudinal directions and the outer circumference is arranged in a radial plane, wherein the bulkhead (17) comprises a first bulkhead part and at least one second bulkhead part (19, 21), wherein said at least one second bulkhead part (19, 21) is manufactured by rotational moulding or vacuum forming;
aligning the at least one second bulkhead part relative to the first bulkhead part in the longitudinal or radial direction; and
bringing the first bulkhead part and the at least one second bulkhead part into contact with each other to form the bulkhead (17", 17'''), wherein the first bulkhead part is arranged relative to the at least one second bulkhead part such that a first installation flange (20a) of the first bulkhead part contacts a second installation flange (20b) of the at least one second bulkhead part.

2. The method according to claim 1, wherein the method further comprises the step of mounting or integrating at least one element (18) on the bulkhead (17) prior to installation of the bulkhead unit (16), wherein said at least one element (18) is arranged on at least one of a first side of the first bulkhead part and a second side of the at least one second bulkhead part.

3. A method of installing the bulkhead unit (16) according to claim 1 in the wind turbine blade (5) of a wind turbine (1), the wind turbine blade (5) extends in the longitudinal direction from the blade root (6) to the tip end (7) and in the chordwise direction from the leading edge (8) to the trailing edge (9), wherein the wind turbine blade (5) comprises a blade shell (10) defining a pressure side (11) and a suction side (12), the wind turbine blade (5) further comprises a blade root section (13) comprising the blade root (6), wherein the method comprises the steps of:
providing at least one of the bulkhead unit (16), wherein the at least one bulkhead unit (16) is pre-assembled prior to installation;
positioning said at least one bulkhead unit (16) in the blade root section (13) at a predetermined distance from the blade root (6); and
installing the at least one bulkhead unit (16) inside the wind turbine blade (5) so that said at least one bulkhead unit (16) substantially seals off the blade root.

4. The method according to claim 3, wherein the method further comprises the step of milling an inner surface of the blade root section (13) prior to positioning the at least one bulkhead unit (16) in the blade root section (13).

5. The method according to claim 3, wherein the method further comprises the step of mounting or integrating at least one adjustable element (25) and/or at least one deformable element (26) at the circumference of the at least one bulkhead unit (16) prior to positioning the at least one bulkhead unit (16) in the blade root section (13).

6. A bulkhead (17), having a first side, an opposite second side and an outer circumference, wherein said bulkhead (17) comprises a first bulkhead part and at least one second bulkhead part (19, 21), wherein said at least one second bulkhead part (19, 21) is manufactured by rotational moulding or vacuum forming, and wherein the first bulkhead part is arranged relative to the at least one second bulkhead part such that a first installation flange (20a) of the first bulkhead part contacts a second installation flange (20b) of the at least one second bulkhead part.

7. A bulkhead unit (16), the bulkhead unit (16) is configured to be installed in a blade root section (13) of a wind turbine (1), wherein the bulkhead unit (16) is a pre-assembled unit comprising:
the bulkhead (17) according to claim 6; and
at least one element (18) mounted on or integrated into said bulkhead (17), wherein said at least one element (18) is arranged on at least one of said first and second sides.

8. A wind turbine blade (5) for the wind turbine (1), the wind turbine blade (5) extends in a longitudinal direction from a blade root (6) to a tip end (7) and in a chordwise direction from a leading edge (8) to a trailing edge (9), wherein the wind turbine blade (5) comprises a blade shell

(10) defining a pressure side (11) and a suction side (12), the wind turbine blade (5) further comprises the blade root section (13) comprising the blade root (6) in which at least one of the bulkhead unit (16) is arranged, wherein said at least one of the bulkhead unit (16) is the pre-assembled unit according to claim 7.

9. A wind turbine blade (5) for a wind turbine (1), the wind turbine blade (5) extends in a longitudinal direction from a blade root (6) to a tip end (7) and in a chordwise direction from a leading edge (8) to a trailing edge (9), wherein the wind turbine blade (5) comprises a blade shell (10) defining a pressure side (11) and a suction side (12), the wind turbine blade (5) further comprises a blade root section (13) comprising the blade root (6) in which at least one bulkhead unit (16) is arranged, wherein said at least one bulkhead unit (16) comprises the bulkhead (17) according to claim 6.

10. A method of manufacturing a bulkhead unit (16) for a wind turbine blade (5), the wind turbine blade (5) extends in a longitudinal direction from a blade root (6) to a tip end (7) and in a chordwise direction from a leading edge (8) to a trailing edge (9), wherein the method comprises the steps of:

manufacturing a bulkhead (17), wherein the bulkhead (17), when installed, extends in a radial direction and has at least a first side, a second side, and an outer circumference, the first and second sides face in opposite longitudinal directions and the outer circumference is arranged in a radial plane, wherein the bulkhead (17) comprises at least one bulkhead part (19, 21), wherein said at least one bulkhead part (19, 21) is manufactured by rotational moulding or vacuum forming wherein said step of manufacturing the bulkhead (17) comprises forming at least one installation opening (22) through the bulkhead (17) via moulding; and mounting or integrating at least one element (18) on the bulkhead (17) prior to installation of the bulkhead unit (16), wherein said at least one element (18) is arranged on at least one of a first side of the bulkhead and a second side of the bulkhead, the at least one element (18) engaging with the at least one installation opening (22) formed through the bulkhead (17).

* * * * *